United States Patent [19]

Perry

[11] 4,121,316

[45] Oct. 24, 1978

[54] HAND HELD SCRAPER

[76] Inventor: Michael W. Perry, 2235 S.W. 313, Federal Way, Wash. 98003

[21] Appl. No.: 745,649

[22] Filed: Nov. 29, 1976

[51] Int. Cl.² ........................... A47L 1/06; A47L 1/16
[52] U.S. Cl. ..................................... 15/236 R; 30/172; 428/167
[58] Field of Search ................... 15/104 S, 210.5, 215, 15/235.6, 236 R, 238, 245, 250.41, 237; 17/19, 66; 30/172, 164.5; 68/220; 37/40, 53; D7/181–185; 428/167

[56] References Cited

U.S. PATENT DOCUMENTS

| 218,431 | 8/1879 | Dunham | 15/245 |
| 2,115,216 | 4/1938 | Samuel | 15/236 R |
| 2,277,528 | 3/1942 | Osborn | 15/236 R |
| 2,701,890 | 2/1955 | Moor | 15/215 |
| 2,795,001 | 6/1957 | Wood | 15/215 |
| 2,946,076 | 7/1960 | Morgan | 15/236 R |
| 3,222,697 | 12/1965 | Scheermesser | 428/167 X |
| 3,408,677 | 11/1968 | Yates | 15/236 R |
| 3,599,263 | 8/1971 | Cheiten | 15/111 |
| 3,638,274 | 2/1972 | Farver | 15/250.41 |
| 4,040,140 | 8/1977 | Hopkins | 15/236 R |

FOREIGN PATENT DOCUMENTS

| 67,840 | 2/1915 | Austria | 15/210.5 |
| 966,614 | 4/1975 | Canada | 15/236 R |
| 515,365 | 6/1929 | Fed. Rep. of Germany | 51/392 |
| 456,508 | 4/1950 | Italy | 428/167 |
| 665,395 | 1/1952 | United Kingdom | 15/210.5 |
| 504,083 | 4/1939 | United Kingdom | 15/245 |

Primary Examiner—Daniel Blum
Attorney, Agent, or Firm—Morris A. Case

[57] ABSTRACT

A device for scraping ice or frost from vehicle windows and windshields. A substantially flat flexible member, an edge of which follows the contour of a to be cleared surface has a series of recesses on one side of the member to break up the frozen surface prior to turning the member over for final clearing.

8 Claims, 13 Drawing Figures

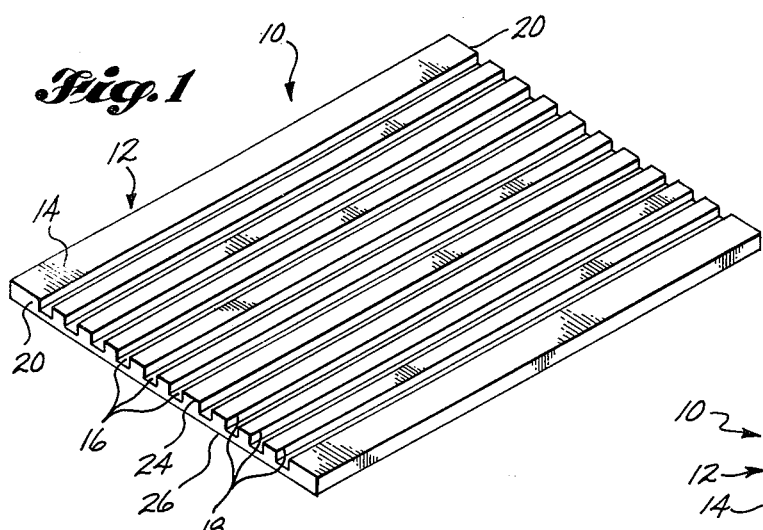
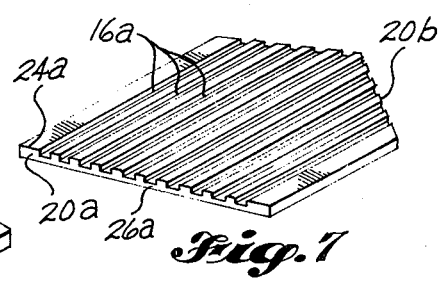
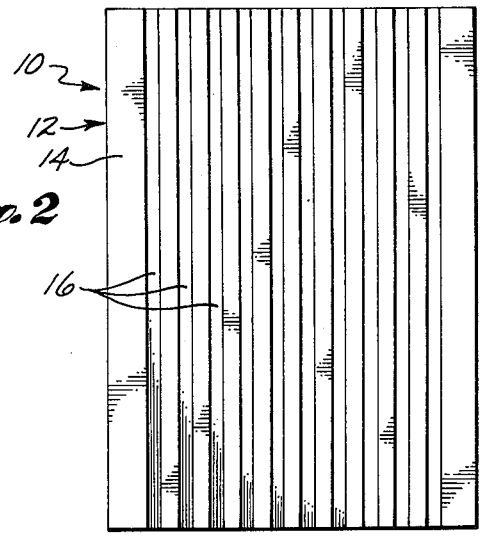
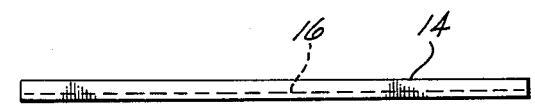
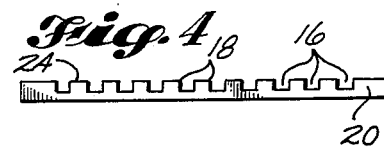
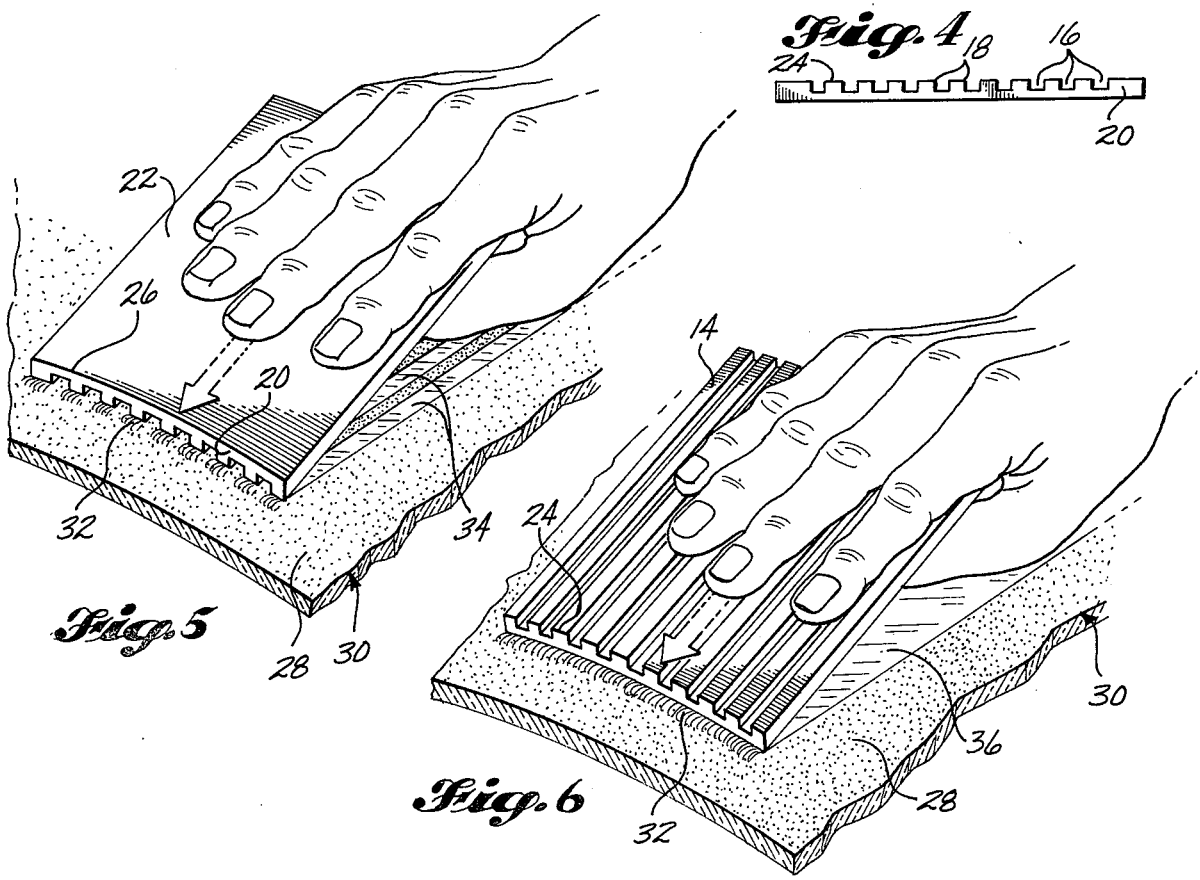

HAND HELD SCRAPER

BACKGROUND OF THE INVENTION

The buildup of ice and frost on windows and windshields of vehicles has long created a hazard during operation of the vehicles due to the loss of visibility. Under normal operating conditions hot air directed onto the inside of the windshield in combination with windshield wipers on the outside will keep an area of the windshield clear. However, during the initial cold weather operation of a vehicle the motor has not had time to generate hot air for heating the windshield and it is necessary to physically remove the ice or frost from all windowed surfaces. Under especially severe driving conditions it may also become necessary to stop the vehicle from time to time and physically remove a buildup of ice or snow from the viewing surfaces.

In U.S. Pat. No. 3,051,975 to Schwartz part of a snow or ice removal device covered a scraper which had a handle, one end of which was a widened surface which sloped to a pointed edge with a flat surface of the handle and on the other surface of the widened flattened handle a number of upwardly extending breaker teeth. In U.S. Pat. No. 3,566,430 to Young a flexible flat base had one surface with a series of outward sharply pointed projections extending in parallel rows, and the opposite side had spaced handles arranged to permit the base to flex in a direction perpendicular to the spaced scraper projections.

SUMMARY OF THE INVENTION

A hard flat flexible member that will follow the contour of a curved surface has a series of essentially parallel recesses extending along one surface of the member.

It is an object of this invention to provide a simple scraper, one side of which is used to break up ice from the surface of a transparent member and the other side of the scraper is used to completely remove the ice and clear the surface.

DESCRIPTION OF THE DRAWINGS

FIG. 1 shows a perspective view of the scraper of this invention.

FIGS. 2, 3 and 4 respectively show the top, side and end views of the scraper of FIG. 1.

FIG. 5 shows a fragmented perspective view of the scraper of FIG. 1 being used to break up ice from a transparent member.

FIG. 6 shows a fragmented perspective view of the scraper removing ice from the transparent member.

FIG. 7 shows a perspective view of a different embodiment of the scraper of this invention.

DETAILED DESCRIPTION

Figure 8:
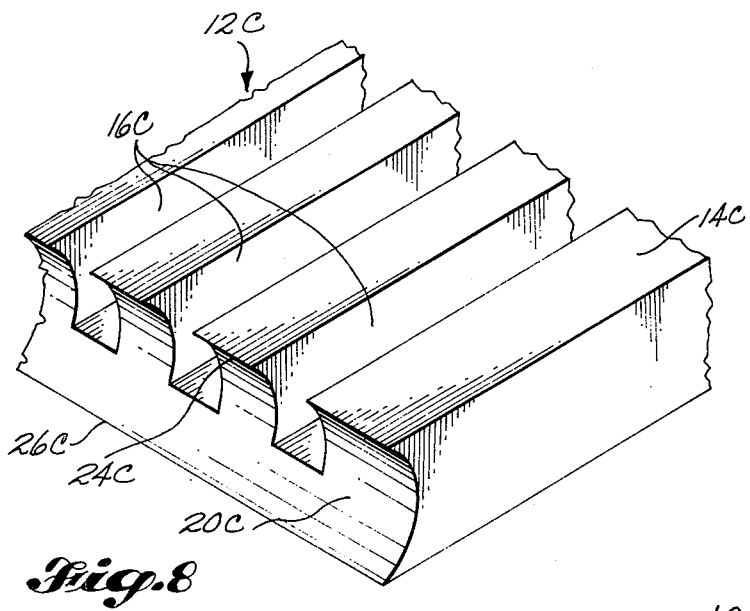
FIG. 8 shows a fragmented perspective view of another embodiment of this invention.

Scraper 10 is made up of an essentially flat plate shaped member 12. This member may be made up of any hard but flexible material. Many different plastics may be used such as but not to be limited to the methyl methacrylate resins. Extending in from surface 14 of the member is a series of recesses 16; which in these embodiments are arranged parallel to each other. The recesses preferably extend perpendicular to the surface 14 to give a sharp corner 18. The ends 20 to which the recesses are open ended are preferably on straight lines and the ends are perpendicular to surfaces 14 and 22 to create a cutting edge 24 at the juncture of surface 14 and end 20, and also a cutting edge 26 at the juncture of surface 22 and end 20. The recesses preferably extend longitudinally with ends having the cutting edges extending laterally. These ends may be at right angles to the direction of the recesses such that the recesses extend normal to at least one end of the plate as is shown in FIGS. 1 through 6 or may be on a bias as is shown in FIGS. 7 and 11 through 13. In FIG. 7, end 20a with cutting edges 24a and 26a extends on a bias to the direction of extension of recesses 16a. When the bias is at 45° it will throw the removed ice to the side. When an end is biased in two directions this double bias forms a wedge as at end 20b of FIG. 7, the removed ice is thrown aside in two directions away from the scraper.

Figure 9:
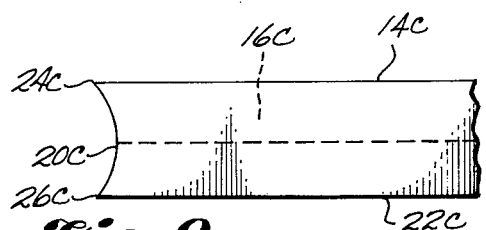
FIG. 9 shows a fragmented side view of the scraper of FIG. 8.

FIGS. 8 and 9 show yet another embodiment of the invention wherein recesses 16c open end at an arcuate shaped end 20c of scraper member 12c to create sharp cutting edge 24c at the juncture with surface 14c and sharp cutting edge 26c at the juncture with surface 22c.

Figure 10:
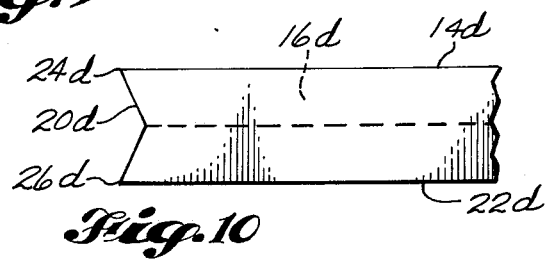
FIG. 10 shows a fragmented side view of yet another embodiment of a scraper of this invention.
Figure 11:
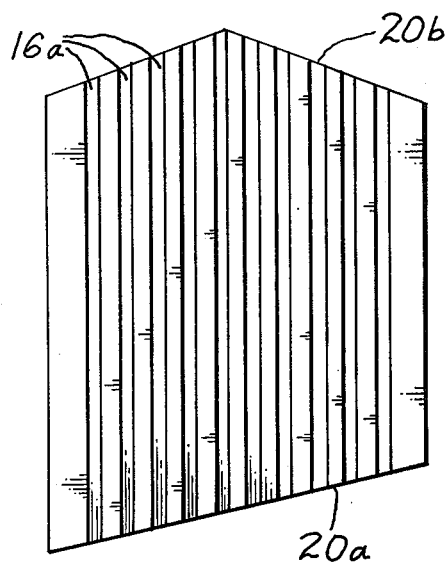
FIG. 11 shows a plan view of the embodiment of FIG. 7.

In FIG. 10 yet another embodiment shows a concave end 20d to be formed of a pair of inwardly extending surfaces which form a sharp cutting edge 24d at the juncture with surface 14d and sharp cutting edge 26d at the juncture with surface 22d.

Figure 12:
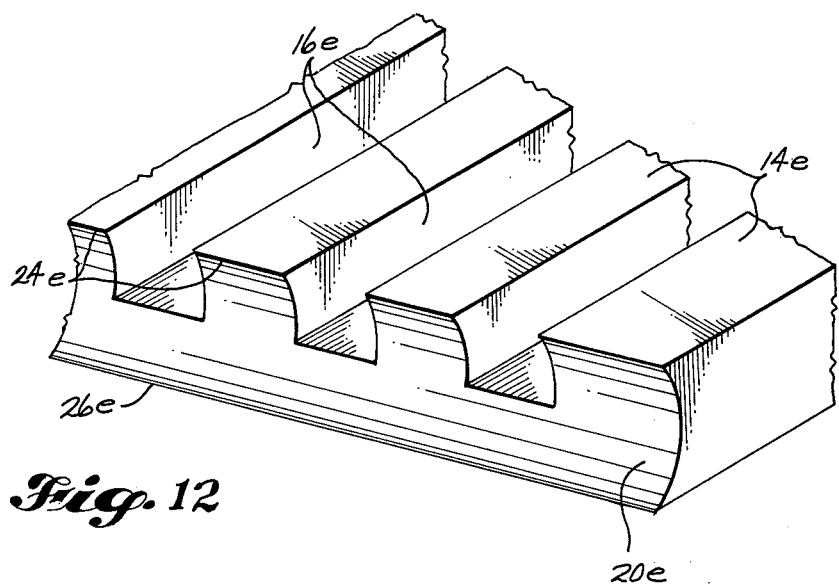
FIGS. 12 and 13 each show an enlarged fragmented perspective view of a different embodiment of the scraper of FIGS. 7 and 11.
Figure 13:
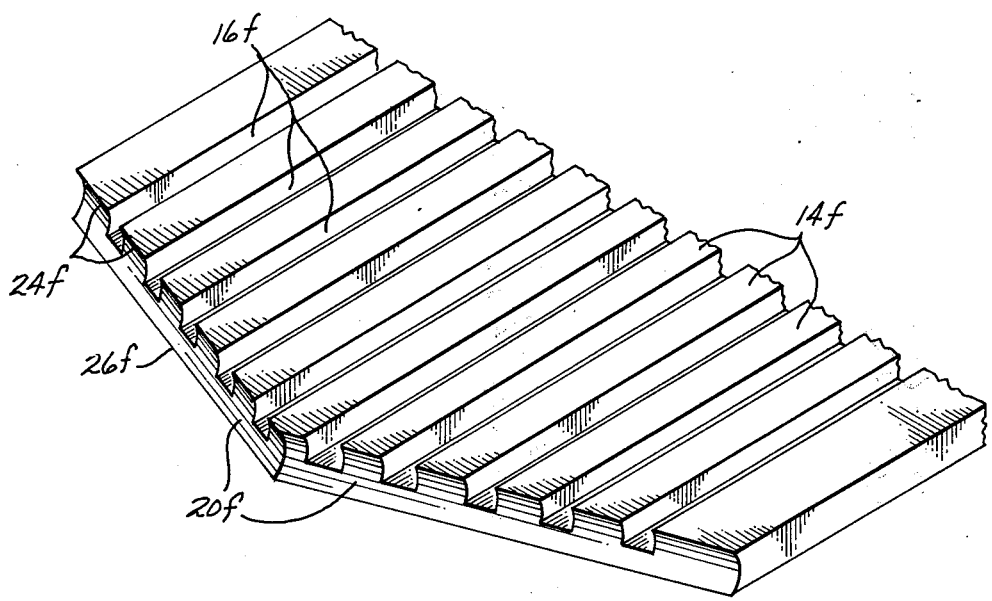

FIGS. 12 and 13 show other embodiments of the invention wherein biased ends of a scraper are concave in shape. In FIG. 12 recesses 16e open, at concave shaped end 20e with cutting edges 24e and 26e, and the end 20e extends on a bias to the direction of extension of recesses 16e. In FIG. 13 recesses 16f open end at concave shaped end 20f with cutting edges 24f and 26f, and the end 20f extends on a double bias to the direction of extension recesses 16f.

In operation the scraper 10 is used to remove frozen water in the form of snow, ice or frost. FIGS. 5 and 6 show the scraper being used to remove a heavy coating of ice 28 from a contoured windshield 30, in the form of ice particles 32. In FIG. 5 surface 14 of scraper 10 is turned toward the windshield, and the scraper grasped with the recesses aligned parallel to the direction one wishes to scrape. The cutting edge 24 is placed in contact with the windshield, the flexibility of the member 12 assures the edge of the scraper following the contour of the windshield as the scraper progresses, and strips 34 are cleaned in the coating of ice. The scraper is then turned over with surface 22 down and edge 26 is used to scrape the windshield clean and expose cleaned surface 36.

I claim:

1. A device for removing frozen water from a surface of a transparent member comprising: an elongated hard plate flexible to permit following a contour of a surface of a transparent member with said plate having a series of longitudinally extending recesses to extend part way in from a surface of the plate, an end of the plate extending laterally on a bias with said end having cutting edges to contact and remove frozen water from the surface of the transparent member, and the end of the plate that extends laterally on a bias being concave.

2. A scraper for removing frozen water from a transparent surface comprising: a hard essentially flat elongated flexible member having a series of recesses extending in a direction essentially perpendicular to one surface of the member, at least one end of the elongated flat member extending laterally with said end having cutting edges to contact and remove frozen water from a transparent surface, the recesses being located to extend longitudinally essentially parallel to each other and to open at the end of the plate that extends laterally, and the laterally extending end being concave in shape.

3. A scraper for removing frozen water from a transparent surface comprising: a hard essentially flat elongated flexible member having a series of recesses extending in a direction essentially perpendicular to one surface of the member, at least one end of the elongated flat member extending laterally with said end having cutting edges to contact and remove frozen water from a transparent surface, the recesses being located to extend longitudinally essentially parallel to each other and to open at the end of the plate that extends laterally, and the laterally extending end of the flat member extends extends on a bias to the direction of the recesses.

4. A scraper as in claim 3 wherein said end of the member extends perpendicular to the surface from which the recesses extend.

5. A scraper as in claim 3 wherein the end that extends on a bias is concave.

6. A scraper for removing frozen water from a transparent surface comprising: a hard essentially flat elongated flexible member having a series of recesses extending in a direction essentially perpendicular to one surface of the member, at least one end of the elongated flat member extending laterally with said end having cutting edges to contact and remove frozen water from a transparent surface, the recesses being located to extend longitudinally essentially parallel to each other and to open at the end of the plate that extends laterally, and the laterally extending end of the flat member extends on a double bias with respect to the direction of the recesses to form a wedge.

7. A scraper as in claim 6 wherein said end of the member extends perpendicular to the surface from which the recesses extend.

8. A scraper as in claim 6 wherein the end having a double bias is concave in shape.

* * * * *